(12) United States Patent
Wu

(10) Patent No.: US 8,715,773 B2
(45) Date of Patent: May 6, 2014

(54) METHOD OF MAKING A FILTER

(75) Inventor: Chun-ming Wu, Shenzhen (CN)

(73) Assignee: Shenzhen China Star Optoelectronics Technology Co., Ltd., Shenzhen (CN)

(*) Notice: Subject to any disclaimer, the term of this patent is extended or adjusted under 35 U.S.C. 154(b) by 322 days.

(21) Appl. No.: 13/146,228

(22) PCT Filed: May 11, 2011

(86) PCT No.: PCT/CN2011/073932
§ 371 (c)(1),
(2), (4) Date: Jul. 26, 2011

(87) PCT Pub. No.: WO2012/145940
PCT Pub. Date: Nov. 1, 2012

(65) Prior Publication Data
US 2012/0288624 A1 Nov. 15, 2012

(51) Int. Cl.
B05D 5/12 (2006.01)
B05D 5/06 (2006.01)
B05D 1/36 (2006.01)

(52) U.S. Cl.
USPC .......... 427/64; 427/58; 427/66; 427/68; 427/108; 427/264

(58) Field of Classification Search
USPC .......... 427/58, 64, 66, 67, 68, 108, 264, 265, 427/266, 269, 270
See application file for complete search history.

(56) References Cited

U.S. PATENT DOCUMENTS

| | | | | |
|---|---|---|---|---|
| 5,340,619 A | * | 8/1994 | Chen et al. | 427/498 |
| 2004/0009303 A1 | * | 1/2004 | Ito et al. | 427/421 |

FOREIGN PATENT DOCUMENTS

| | | |
|---|---|---|
| CN | 101082729 A | 12/2007 |
| CN | 101592827 A | 12/2009 |
| CN | 101241276 B | 6/2010 |
| CN | 101726907 A | 6/2010 |
| JP | 2005165073 A | 5/2005 |

* cited by examiner

Primary Examiner — Michael Cleveland
Assistant Examiner — Austin Murata
(74) Attorney, Agent, or Firm — Ditthavong Mori & Steiner P.C.

(57) ABSTRACT

A method of making a filter adjusts the bottom heights of the color-resisting colors to make the top ends of the color-resisting blocks be in a same level by disposing the foundation layer between the transparent substrate and the light-shielding layer and disposing the groove in the foundation layer, so that ensuring that surfaces of the filter have a good evenness and the alignment of liquid crystals is normal for enhancing the displaying effect of the liquid crystal display. The present invention improves the bottom evenness of the through holes by disposing the foundation layer on the bottoms of the through holes, thereby eliminating the "ox horn-shaped segment difference" of the protruding edges of the color-resisting blocks formed later.

11 Claims, 10 Drawing Sheets

METHOD OF MAKING A FILTER

BACKGROUND OF THE INVENTION

1. Field of the Invention

The present invention relates to a manufacture field of a liquid crystal display, and more particularly to a method of making a filter.

2. Description of the Prior Art

FIG. 1 is a schematic diagram of implementation steps of a filter making method in the prior art, including the following steps: a step S10 providing a transparent substrate; a step S11 forming a light-shielding layer on a surface of the transparent substrate; step S12 patterning the light-shielding layer to form a first groove, a second groove and a third groove therein; a step S13 forming a first color-resisting block on the position of the first groove; and a step S14 orderly forming a second and third color-resisting blocks on the positions of the second and third grooves.

FIGS. 2A-2E show process schematic views of the filter making method in the above prior art.

As shown in FIG. 2A and referring to the step S10, the transparent substrate 200 is provided. The transparent substrate 200 is a support body of a filter, and the material thereof may be, but not limited to, glass.

As shown in FIG. 2B and referring to the step S11, the light-shielding layer 210 is formed on the surface of the transparent substrate 200. The light-shielding layer 210 is made of a black light-shielding material for forming a separate section between the color-resisting blocks having different colors. There is no light passing through the separate section thereby distinguishing the edges between the color-resisting blocks having different colors.

As shown in FIG. 2C and referring to the step S12, the light-shielding layer 210 is patterned to form the first groove 211, the second groove 212 and the third groove 213 therein. This step may adopt a common photo-etching development process to form a predetermined pattern in the light-shielding layer 210. The predetermined pattern should include the first groove 211, the second groove 212 and the third groove 213, which are used to receive the color-resisting blocks having three different colors, such as red, green, and blue, for forming one pixel. Of course, in the application, it may include more groups of grooves for receiving more pixels according to the design demand. The number of the color-resisting blocks of each pixel and the corresponding grooves also may be increased or reduced according to the factual demand.

As shown in FIG. 2D and referring to the steps S13 and S14, the first color-resisting block 231 is formed on the position of the first groove 211, and the second color-resisting block 232 and the third color-resisting block 233 are orderly formed on the positions of the second groove 212 and the third groove 213 according to the method of the step S13. This step may first form a continuous first light-resisting layer (not shown in FIG. 2D), which is used to form the first color-resisting block 231, on the light-shielding layer 210; and then may adopt the common photo-etching development process to remove unnecessary parts and remain the partial first light-resisting layer corresponding to the first groove 211, so that forming the first color-resisting block 231. The methods of forming the second color-resisting block 232 and the third color-resisting block 233 are same as above. The above three color-resisting blocks 231, 232 and 233 may represent the three-color color-resisting blocks of a red resister, a green resister, a blue resister and so on, thereby forming a separate color pixel on the surface of the transparent substrate 200. Of course, the transparent substrate 200 also may further dispose more above three-color color-resisting blocks thereon for producing more pixels. And each pixel also may not be limited to three blocks, for example, may include only one or two color-resisting blocks applied to the gray display. For more advanced design, it cannot exclude the possibilities of adopting the more color-resisting blocks.

The disadvantage of the prior art is that: the chromas of the color blocks are in proportion to its film thickness, namely the chroma is controlled by their film thickness, so the heights of the different color-resisting blocks are determined by the demand for the product chroma. But because the materials of different color blocks are different, that results in the thicknesses of the color-resisting blocks of three colors being different from each other after becoming films and the heights of the three blocks also being different. As shown in FIG. 2D, the height of the first color-resisting block 231 is apparently higher than those of the two other color-resisting blocks. Because of the evenness of inside surfaces of the filter being not good, the abnormity easily occurs during the alignment of liquid crystals and affects the picture-displaying result displayed by the liquid crystal display.

Moreover, in the stacked area between the colorized color-resisting blocks and the remained light-shielding layer, two ends of the three color-resisting blocks 231, 232 and 233 are protruding due to effect of the light-shielding layer, as shown in FIG. 2E, so that resulting in the so-called "ox horn-shaped segment difference" and the evenness of inside surfaces of the filter being not good.

BRIEF SUMMARY OF THE INVENTION

To solve the foregoing technical problems, an object of the present invention is to provide a method of making a filter, being capable of solving the problems of the bad evenness of inside surfaces of the filter and the "ox horn-shaped segment difference".

To solve the foregoing technical problems, the present invention provides a method of making a filter, which includes the following steps: providing a transparent substrate; calculating a thickness difference between different color-resisting blocks; forming a patterned foundation layer and a patterned light-shielding layer on a surface of the transparent substrate, wherein the patterned light-shielding layer including a first through hole, a second through hole and a third through hole, the foundation layer under at least one of the first, second and third through holes having a groove, and the depth of the groove being determined by the thickness difference of the color-resisting blocks obtained by calculating; forming a first color-resisting block on the position of the first through hole; and orderly forming a second and third color-resisting blocks on the positions of the second and third through holes according to the previous step.

As a selectable technical solution, the step of forming the patterned foundation layer and the patterned light-shielding layer on the surface of the transparent substrate further includes: forming a continuous foundation layer on the surface of the transparent substrate; patterning the foundation layer to form at least one groove therein corresponding to the position of the through hole in the light-shielding layer according to the thickness difference of the color-resisting blocks obtained by calculating; forming a continuous light-shielding layer on a surface of the foundation layer; and patterning the light-shielding layer to form the first, second and third through holes.

As a selectable technical solution, the step of forming the patterned foundation layer and the patterned light-shielding layer on the surface of the transparent substrate further includes: forming a continuous foundation layer on the surface of the transparent substrate; forming a continuous light-shielding layer on a surface of the foundation layer; patterning the light-shielding layer to form the first, second and third through holes; and patterning the foundation layer to form at least one groove therein corresponding to the position of the through hole in the light-shielding layer according to the thickness difference of the color-resisting blocks obtained by calculating.

As a selectable technical solution, the first, second and third color-resisting blocks are orderly a red resister, a green resister and a blue resister.

As a selectable technical solution, in the step of calculating the thickness difference between the different color-resisting blocks, the obtained thicknesses of the second and third color-resisting blocks by calculating are same and both less than that of the first color-resisting block; so in the step of forming the patterned foundation layer and the patterned light-shielding layer on the surface of the transparent substrate, the groove is formed on the foundation layer only under the first through hole, and the depth of the groove is equal to the thickness difference between the first and second color-resisting blocks.

As a selectable technical solution, in the step of calculating the thickness difference between the different color-resisting blocks, the obtained thickness of the third color-resisting block by calculating is less than that of the second color-resisting block, and the thickness of the second color-resisting block is less than that of the first color-resisting block; so in the step of forming the patterned foundation layer and the patterned light-shielding layer on the surface of the transparent substrate, the foundation layer forms a first groove and a second groove separately located under the first through hole and the second through hole, the depth of the first groove is equal to the thickness difference between the first and third color-resisting blocks, and the depth of the second groove is equal to the thickness difference between the second and third color-resisting blocks.

The present invention further provides a method of making a filter, which includes the following steps: providing a transparent substrate; forming a patterned light-shielding layer on a surface of the transparent substrate, wherein the light-shielding layer including multiple through holes, and disposing a foundation layer on the surface of the transparent substrate under the bottoms of the through holes; and forming color-resisting blocks on the positions of the through holes, wherein the position of each one through hole correspondingly forms one color-resisting block.

As a selectable technical solution, the step of forming the patterned light-shielding layer on the surface of the transparent substrate further includes: forming a continuous foundation layer on the surface of the transparent substrate; patterning the foundation layer to expose the transparent substrate under thereof; forming a continuous light-shielding layer on a surface of the patterned foundation layer; and patterning the light-shielding layer to form multiple through holes therein, which are corresponding to a remained part of the patterned foundation layer.

As a selectable technical solution, the step of forming the patterned light-shielding layer on the surface of the transparent substrate further includes: forming a continuous light-shielding layer on the surface of the transparent substrate; patterning the light-shielding layer to form multiple through holes therein; forming a continuous foundation layer on a surface of the patterned light-shielding layer; and patterning the foundation layer, and remaining the foundation layer disposed on the bottoms of the through holes.

As a selectable technical solution, the color-resisting blocks include a red resister, a green resister and a blue resister.

The present invention further provides a method of making a filter. the filter includes a first, second and third color-resisting blocks. The thicknesses of the second and third color-resisting blocks are same and both less than that of the first color-resisting block. The method includes the following steps: providing a transparent substrate; calculating a thickness difference between the second color-resisting block and the first color-resisting block; forming a continuous foundation layer on a surface of the transparent substrate; patterning the foundation layer, and according to the thickness difference of the color-resisting blocks obtained by calculating to form a groove on the foundation layer under the position of a first through hole, which will be formed soon, wherein the depth of the groove being equal to the thickness difference of the first and second color-resisting blocks; forming a continuous light-shielding layer on a surface of the foundation layer; patterning the light-shielding layer to form the first through hole, a second through hole and a third through hole; forming the first color-resisting block on the position of the first through hole; and orderly forming the second and third color-resisting blocks on the positions of the second and third through holes according to the previous step.

The advantage of the present invention is to adjust the bottom heights of the color-resisting colors and make the top ends of the color-resisting blocks be in a same level by disposing the foundation layer between the transparent substrate and the light-shielding layer and disposing the groove in the foundation layer, so that ensuring that surfaces of the filter have a good evenness and the alignment of liquid crystals is normal for enhancing the displaying effect of the liquid crystal display. The present invention reduces the depths of the through holes by disposing the foundation layer on the bottoms of the through holes and by the foundation layer stacked in the through holes, thereby improving the bottom evenness of the through holes and eliminating the "ox horn-shaped segment difference" of the protruding edges of the color-resisting blocks formed later. The thickness of the foundation layer is less than that of the light-shielding layer. For the specific thickness of the foundation layer, it may be determined by the thickness of the light-shielding layer, the material of the color-resisting blocks, the product chroma, the designer experience obtained by experiment, and so on.

DETAILED DESCRIPTION OF THE PREFERRED EMBODIMENTS

The following text with reference to the accompanying drawings is a detail description for the specific embodiment of a method of making a filter provided by the present invention.

For more clearly and easily understanding the object, the feature and the advantage of the present invention, the preferred embodiments with reference to the accompanying drawings now have been given for detail describing the technical features of the different embodiments of the present invention, wherein the configurations of all elements of the embodiments are intended to illustrate, but not to limit, the present invention. The labels of the elements of the different embodiments are partially repeated in the figures for simplifying the description and not intently indicating that the different embodiments have relevance.

Figure 1:
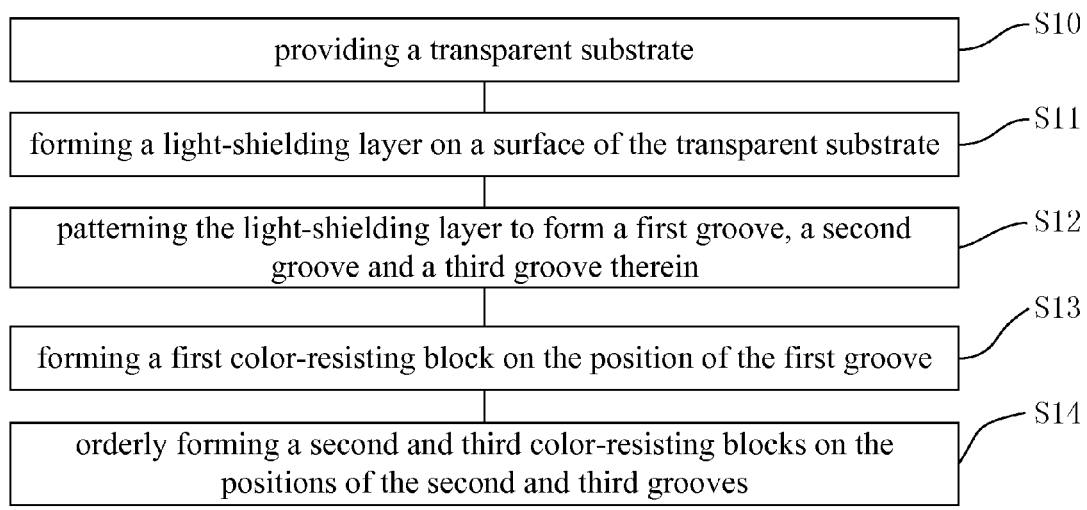
FIG. 1 is a schematic diagram of implementation steps of a filter making method in the prior art.
Figure 2A:
FIGS. 2A-2E are process schematic views of the filter making method in the above prior art.
Figure 2B:
Figure 2C:
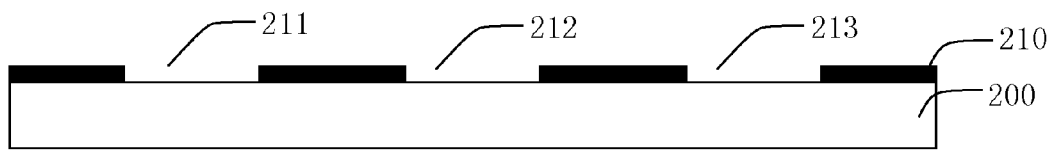
Figure 2D:
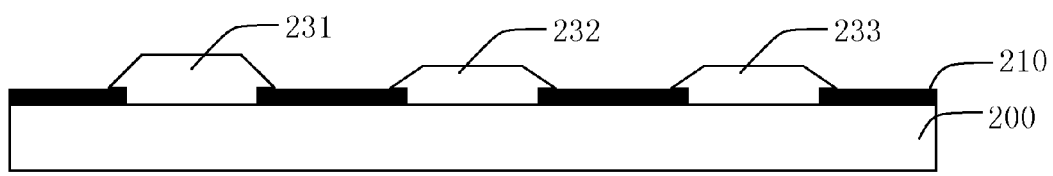
Figure 2E:
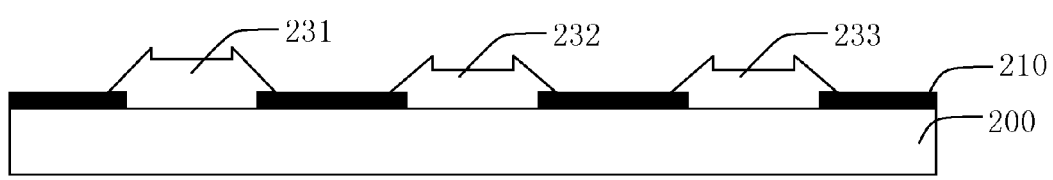
Figure 3:
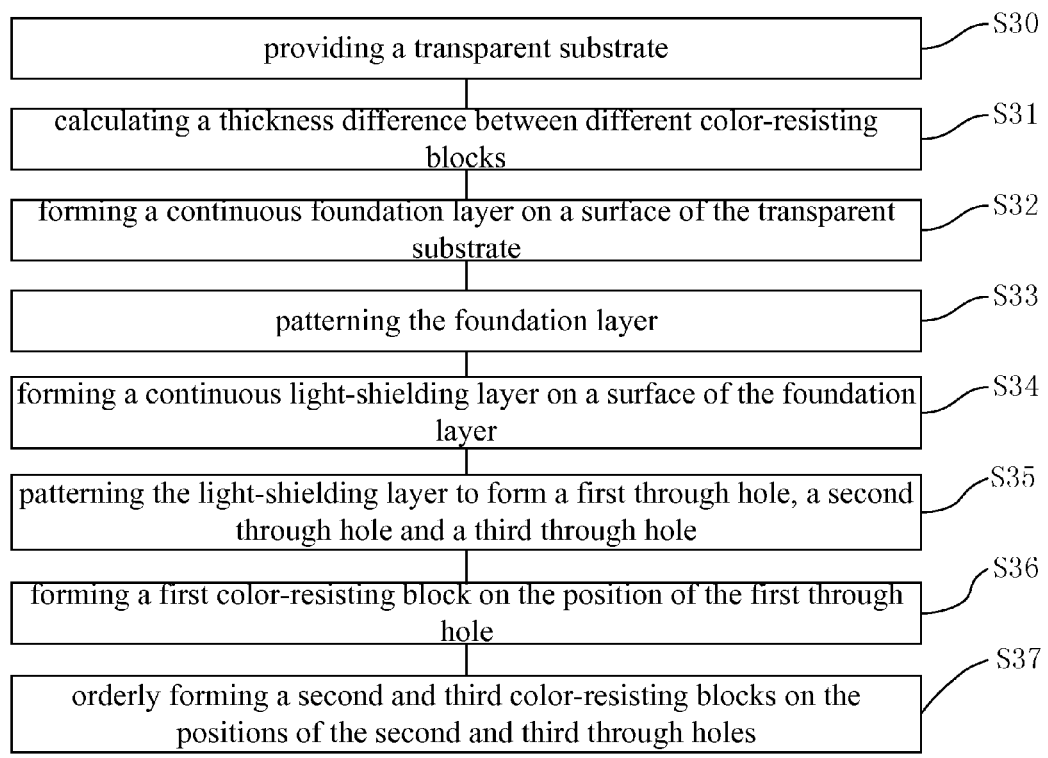
FIG. 3 is a schematic diagram of implementation steps of a first embodiment of a method of making a filter in the present invention.

FIG. 3 is a schematic diagram of implementation steps of a first embodiment of a method of making a filter in the present invention, including the following steps: a step S30 providing a transparent substrate; a step S31 calculating a thickness difference between different color-resisting blocks; a step S32 forming a continuous foundation layer on a surface of the transparent substrate; a step S33 patterning the foundation layer; a step S34 forming a continuous light-shielding layer on a surface of the foundation layer; a step S35 patterning the light-shielding layer to form a first through hole, a second through hole and a third through hole; a step S36 forming a first color-resisting block on the position of the first through hole; and a step S37 orderly forming a second and third color-resisting blocks on the positions of the second and third through holes according to the previous step.

FIGS. 4A-4G are process schematic views of the method of the above first embodiment.

Figure 4A:
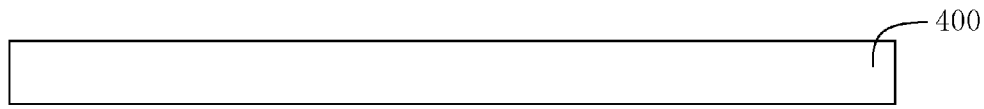
FIGS. 4A-4G are process schematic views of the method of the above first embodiment.

As shown in FIG. 4A and referring to the step S30, the transparent substrate 400 is provided. The transparent substrate 400 is a support body of a filter, and the material thereof may be, but not limited to, glass.

Referring to the step S30, the thickness difference between the different color-resisting blocks is calculated. The performing order of the steps S30 and S31 may be exchanged. Because the chromas of the different color-resisting blocks are in proportion to their film thickness, namely the chroma is controlled by the film thickness, the height of the different color-resisting blocks is determined by the demand for the product chroma. But because the materials of different color blocks are different, that results in the thicknesses of the different color-resisting blocks being different from each other after becoming films and the heights thereof also being different. During the stage of designing the product, the designer can calculate the film thickness of each color-resisting block and the thickness difference therebetween according to the materials and the demand for the product chroma.

In this embodiment, the color-resisting blocks include the first, second and third color-resisting blocks, which are corresponding to a red resister, a green resister and a blue resister, respectively. By calculating, the thicknesses of the second and third color-resisting block are same and both less than that of the first color-resisting block. Namely, there are existed two color-resisting blocks, the thicknesses of which are substantially same and both are less than (also may be greater than in other embodiments) that of another color-resisting block. In other application occasion, such as the application of gray display, there maybe include only one or two color-resisting blocks. For more advanced design, it cannot exclude the possibilities of adopting more color-resisting blocks.

The relations of the steps S31 and S32 are coordinative. There is no special demand for their performing order, and their performing order may be changed.

Figure 4B:
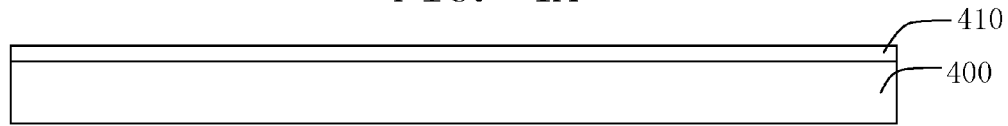

As shown in FIG. 4B and referring to the step S32, the continuous foundation layer 410 is formed on the surface of the transparent substrate 400. The function of the foundation layer 410 is to adjust the bottom heights of the through holes for eliminating the thickness difference between the color-resisting blocks having different thicknesses. Therefore, the material of the foundation layer 410 should be a transparent material.

Figure 4C:
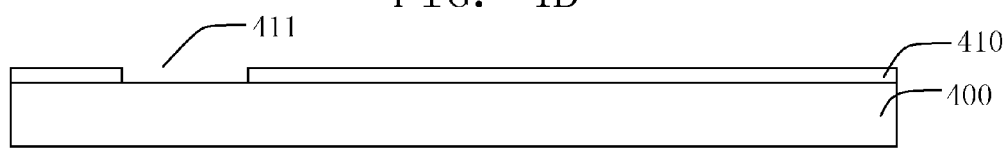

As shown in FIG. 4C and referring to the step S33, the foundation layer 410 is patterned. According to the thickness difference of the color-resisting blocks obtained by calculating, one or two grooves are formed on the surface of the foundation layer 410 and corresponding to the positions of the through holes in the light-shielding layer. The through holes on the light-shielding layer mentioned in this step will be formed on the following steps. According to the product design, when performing this step, it has been known in advance that where the through holes will be formed in the following steps and the position of each through hole will form the color-resisting block of which color. Therefore, the grooves may be formed in the foundation layer 410 in advance, for eliminating the thickness difference between the color-resisting blocks having different thicknesses.

As mentioned in the step S31, in this embodiment, it has been known that the thicknesses of the second and third color-resisting blocks obtained by calculating are same and both less than that of the first color-resisting block. Therefore, this step may only provide one groove 411 formed on the foundation layer 410 under the first through hole. And the depth of the groove 411 should be equal to the thickness difference between the first color-resisting block and the second color-resisting block (or the third color-resisting block), thereby eliminating the thickness difference between the two color-resisting blocks. Of course, the depth of the groove 411 also needs to be adjusted according to the effect of the following steps on the different color-resisting blocks and the surface of the groove 411, and not is strictly equal to the thickness difference of the color-resisting blocks, but should ensure that the top ends of the three color-resisting blocks are finally in a same level. Therefore, the depth of the groove 411 is determined by the thickness difference of the color-resisting blocks, but not is strictly equal to the thickness difference of the color-resisting blocks. In this embodiment, the method for forming the groove 411 may adopt the common photo-etching development process. Because the depth of the groove 411 has been calculated in advance to be equal to the thickness difference between the first color-resisting block and the second color-resisting block (or the third color-resisting block), the depth of the foundation layer 410 formed in the step S32 may be controlled to be equal to the depth of the groove 411 for being convenient to directly etch the foundation layer 410 unto the transparent substrate 400, and the depth of the obtained groove 411 is a determined depth.

In other embodiments, the calculating result in the step S31 may be that the thickness of the third color-resisting block is less than that of the second color-resisting block, and the second color-resisting block is less than the first color-resisting block. Namely, the thicknesses of the three blocks are different from each other. Therefore, in the step S33, a first groove and a second groove are formed in the foundation layer under the first through hole and the second through hole, respectively. The depth of the first groove is equal to the thickness difference of the first and third color-resisting blocks, and the depth of the second groove is equal to the thickness difference of the second and third color-resisting blocks, thereby eliminating the thickness difference of the three color-resisting blocks. For the embodiment including other number of the color-resisting blocks, the arrangement of the grooves and the selection of the depth may be designed with reference to the substantive technology disclosed by the above embodiment, and not repeated herein.

For the process of forming multiple grooves, the method of forming the grooves still may adopt the common photo-etching development process, and the method of controlling the depths of the grooves may be realized by the means of controlling the etching time. The etching process should separately process the grooves of different depths. For example, first, exposing the position of the first groove is to form the first groove having a first depth, and then exposing the position of the second groove is to form the second groove having a second depth.

Figure 4D:
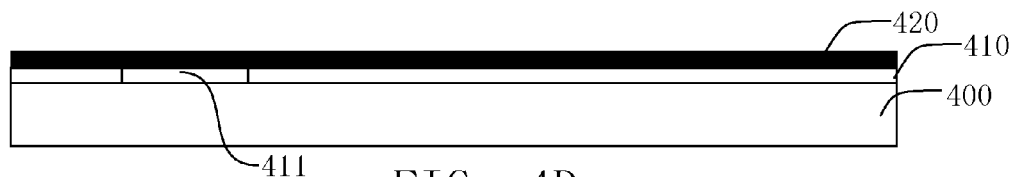

As shown in FIG. 4D and referring to the step S34, the continuous light-shielding layer 420 is formed on the surface of the foundation layer 410. The light-shielding layer 420 is made of a black light-shielding material to form a separate section between the color-resisting blocks having different colors. There is no light passing through the separate section thereby distinguishing the edges between the color-resisting blocks having different colors. This step may adopt a coating method, or an adhering method and other common method. If the light-shielding layer 420 has certain strength and surface tension, it can be suspended upon the groove 411 and may not fill up the groove 411, as shown in FIG. 4D. If the texture of light-shielding layer 420 is soft, it may fill into the groove 411 (not shown in FIGS).

Figure 4E:
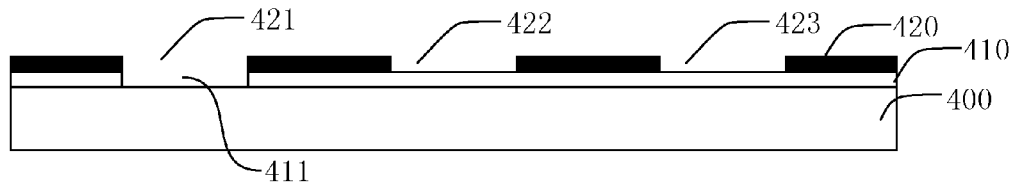

As shown in FIG. 4E and referring to the step S35, the light-shielding layer 420 is patterned to form the first through hole 421, the second through hole 422 and the third through hole 423. The so-called through hole means an aperture of passing through the light-shielding layer 420 unto the foundation layer 410 or unto the transparent substrate 400. The method for patterning the light-shielding layer 420 is similar to that for patterning the foundation layer 410, and the both may adopt the photo-etching process, so not repeated herein.

Figure 4F:
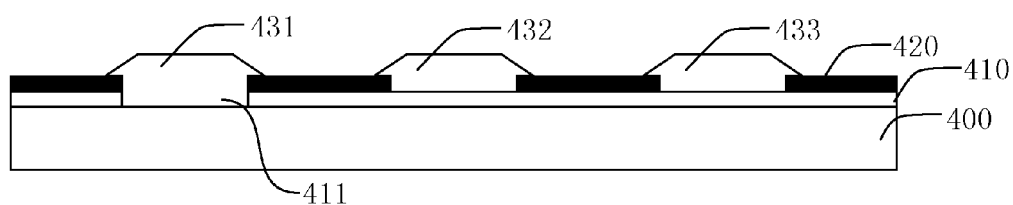

As shown in FIG. 4F and referring to the steps S36 and S37, the first color-resisting block 431 is formed on the position of the first through hole 421; and the second color-resisting block 432 and the third color-resisting block 433 are orderly formed on the positions of the second through hole 422 and the third through hole 423. This embodiment adopts a pigment disperse method for orderly forming the color-resisting blocks of three colors. The process of forming the first color-resisting block 431 is first forming a continuous color-resisting coating layer on the surface of the light-shielding layer 420 by spin coating, and then forming the first color-resisting block 431 on the position of the first through hole 421 by a photo-etching process. The following methods for forming the second color-resisting block 432 and the third color-resisting block 433 are same as above. FIG. 4F shows a schematic view of a filter after completely making the three color-resisting blocks. Subsequently, it needs to perform the following processes of making the filter, such as a splash plating process for plating ITO (Indium Tin Oxide) on the color-resisting blocks, and so on. The relations of the steps S36 and S37 are coordinative. There is no special demand for their performing order, and their performing order may be changed.

Continuously referring to FIG. 4F, the filter made by using above steps includes the transparent substrate 400; the patterned foundation layer 410 disposed on the surface of the transparent substrate 400; the patterned light-shielding layer 420 disposed on the surface of the foundation layer 410 and including the first, second and third through holes 421, 422, 423; the first, second and third color-resisting blocks 431, 432, 433 respectively disposed on the corresponding positions of the first, second and third through holes 421, 422, 423; and the first groove 411 formed in the foundation layer 410 under the first through hole 421. The depth of the first groove 411 is determined by the thickness difference between the first color-resisting block 431 and the second (or third) color-resisting block 432 (or 433).

Figure 4G:
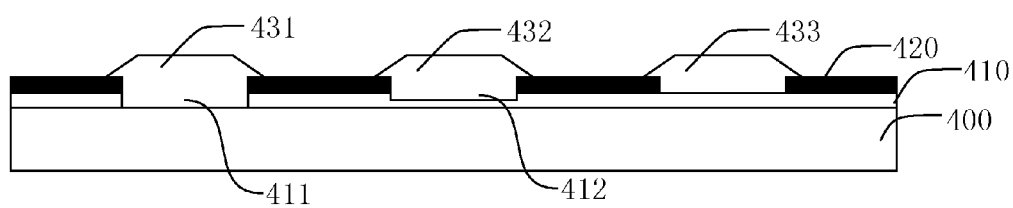

As shown in FIG. 4G, in another embodiment of the filter, maybe the thickness of the third color-resisting block 433 is less than that of the second color-resisting block 432, and the thickness of the second color-resisting block 432 is less than that of the first color-resisting block 431. Accordingly, the foundation layer 410 should form the first groove 411 and the second groove 412 under the first through hole 421 and the second through hole 422, respectively. The depth of the first groove 411 is equal to the thickness difference between the first color-resisting block 431 and the third color-resisting block 433, and the depth of the second groove 412 is equal to the thickness difference between the second color-resisting block 432 and the third color-resisting block 433.

The above mentioned filter disposes the foundation layer 410, and disposes the first groove 411 or the both of the first and second grooves 411, 412 on the foundation layer 410 according to the thickness difference between the first, second and third color-resisting blocks 431, 432, 433, thereby achieving the effect of adjusting the bottom height of the color-resisting blocks and making the top ends of the three color-resisting blocks be in a same level. Therefore, inside surfaces of the filter have a good evenness to ensure that the alignment of liquid crystals is normal and to enhance the displaying effect of the liquid crystal display.

Figure 5:
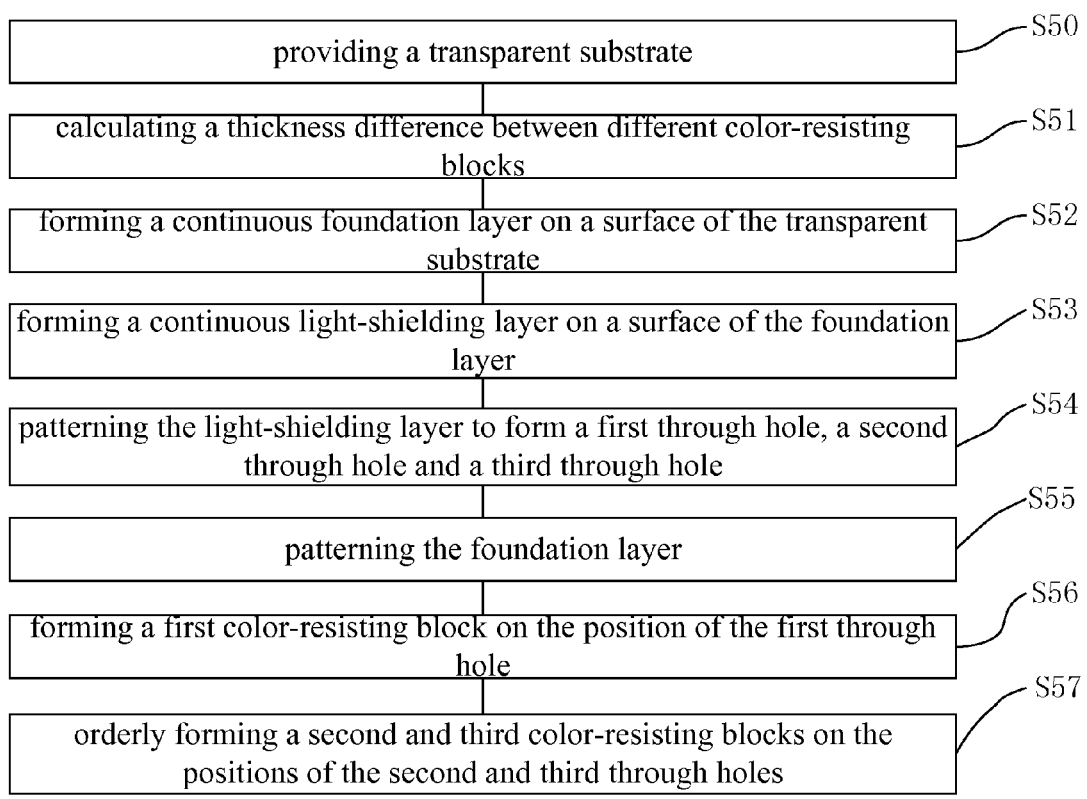
FIG. 5 is a schematic diagram of implementation steps of a second embodiment of a method of making a filter in the present invention.

FIG. 5 shows a second embodiment of a method of making a filter in the present invention, including the following steps: a step S50 providing a transparent substrate; a step S51 calculating a thickness difference between different color-resisting blocks; a step S52 forming a continuous foundation layer on a surface of the transparent substrate; a step S53 forming a continuous light-shielding layer on a surface of the foundation layer; a step S54 patterning the light-shielding layer to form a first through hole, a second through hole and a third through hole; a step S55 patterning the foundation layer; a step S56 forming a first color-resisting block on the position of the first through hole; and a step S57 orderly forming a second color-resisting block and a third color-resisting block on the positions of the second through hole and the third through hole according to the previous step.

The steps S50-S52 are same as those of the first embodiment. Please refer to the previous embodiment and FIGS. 4A and 4B, and not be repeated herein.

Figure 6A:
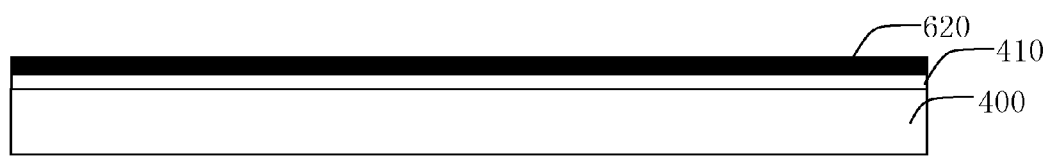
FIGS. 6A-6C are process schematic views of the method of the above second embodiment.

As shown in FIG. 6A and referring to the step S53, the continuous light-shielding layer 620 is formed on the surface of the foundation layer 410. The embodiment is not first patterning the foundation layer 410, but first forming the continuous light-shielding layer 620, and then orderly patterning the two continuous film layers.

Figure 6B:
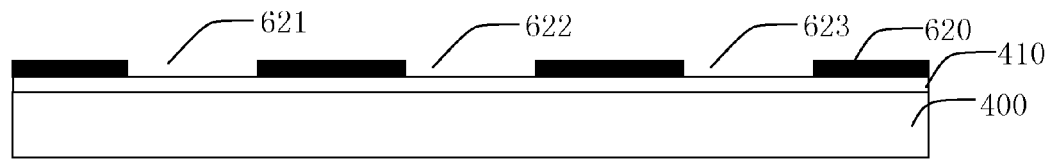

As shown in FIG. 6B and referring to the step S54, the light-shielding layer 620 is patterned to form the first through hole 621, the second through hole 622 and the third through hole 623. These through holes pass through the light-shielding layer 620 to expose the foundation layer 410 under thereof. Although the foundation layer 410 has been not patterned when performing this step, but has been patterned when performing the corresponding step S35 of forming the through holes in the first embodiment, whether the foundation layer 410 under thereof is patterned can not have substantially effect on the patterning process of the above light-shielding layer 620. Therefore, this step is generally same as the step S35 of the first embodiment, and not repeated herein.

Figure 6C:
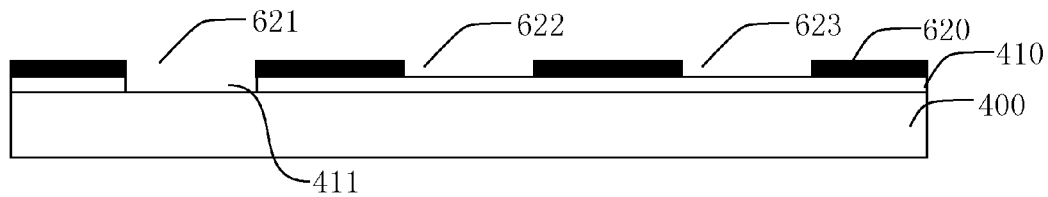

As shown in FIG. 6C and referring to the step S55, the foundation layer 410 is patterned. According to the thickness difference of the color-resisting blocks obtained by calculating, a first groove 411 is formed on the surface of the foundation layer 410 and corresponding to the position of the through hole in the light-shielding layer 620. For the position, number and depth of the groove, other design solutions may refer to the description in the step S35 of the previous embodiment. The groove in this step is formed on the position of the through hole of the light-shielding layer 620, so the existing of the light-shielding layer 620 hasn't an effect on normally performing the process of etching the groove.

The intermediate structure of the filter obtained after performing the above step is generally same as the obtained structure after performing the step S35 of the first embodiment, so the following steps S56 and S57 are generally same as the steps S36 and S37, and not repeated herein.

The difference between this embodiment and the first embodiment is that: the processes of forming the patterned foundation layer and the patterned light-shielding layer in the two embodiments are not completely same. The objects of the both are to form the patterned foundation layer 410 and the patterned light-shielding layer 420(620) on the surface of the transparent substrate 400. The patterned light-shielding layer 420(620) includes the first through hole 421(621), the second through hole 422(622) and the third through hole 423(623). The foundation layer 410 under at least one of the first through hole 421(621), the second through hole 422(622) and the third through hole 423(623) has the groove, the depth of which is determined by the thickness difference of the color-resisting blocks obtained by calculating.

Figure 7:
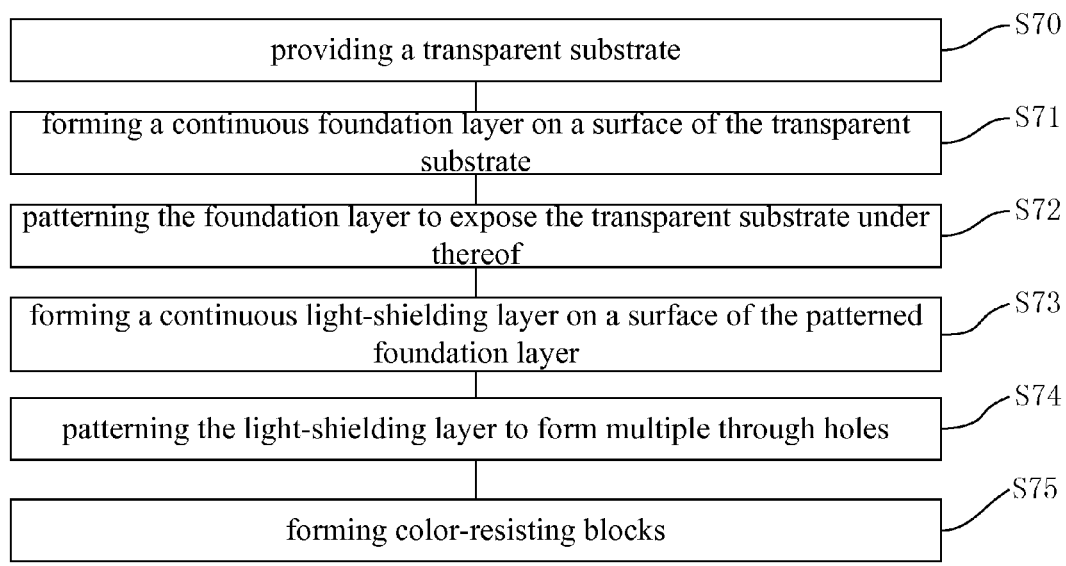
FIG. 7 is a schematic diagram of implementation steps of a third embodiment of a method of making a filter in the present invention.

FIG. 7 shows a third embodiment of a method of making a filter in the present invention, including the following steps: a step S70 providing a transparent substrate; a step S71 forming a continuous foundation layer on a surface of the transparent substrate; a step S72 patterning the foundation layer to expose the transparent substrate under thereof; a step S73 forming a continuous light-shielding layer on a surface of the patterned foundation layer; a step S74 patterning the light-shielding layer to form multiple through holes, which are corresponding to the remained part of the patterned foundation layer; and a step S75 forming color-resisting blocks on the positions of the through holes, wherein the position of each through hole correspondingly forms one color-resisting block.

Figure 8A:
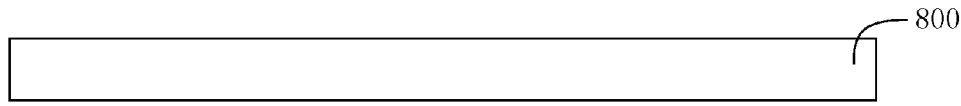
FIGS. 8A-8F are process schematic views of the method of the above third embodiment.

As shown in FIG. 8A and referring to the step S70, the transparent substrate 800 is provided. The transparent substrate 800 is a support body of a filter, and the material thereof may be, but not limited to, glass.

Figure 8B:
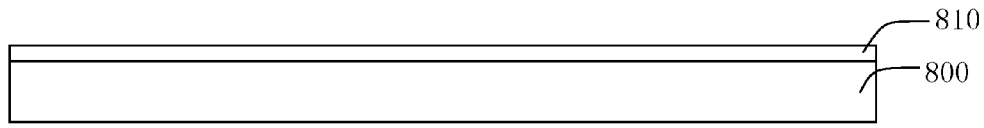

As shown in FIG. 8B and referring to the step S71, the continuous foundation layer 810 is formed on the surface of the transparent substrate 800. The function of the foundation layer 810 is to improve the bottom evenness of the through holes for eliminating the "ox horn-shaped segment difference" caused by the protruding edges of the color-resisting blocks. Therefore, the material of the foundation layer 810 should be a transparent material.

Figure 8C:
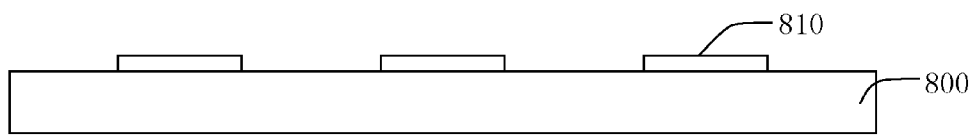

As shown in FIG. 8C and referring to the step S72, the foundation layer 810 is patterned to expose the transparent substrate 800 under thereof. This step may adopt the photoetching process. The remained foundation layer 810 is located on the bottoms of the through holes of the light-shielding layer for improving the bottom evenness of the through holes, but the exposed part of transparent substrate 800 is used to directly form the light-shielding layer on the surface thereof.

Figure 8D:

As shown in FIG. 8D and referring to the step S73, the continuous light-shielding layer 820 is formed on the surface of the patterned foundation layer 810. This step may adopt a coating process to form the light-shielding layer 820, should optimize the thickness of the light-shielding layer 820 for thinner extent, and may adjust the material of the light-shielding layer to make it have higher fluidity. Therefore, the light-shielding layer 820 is capable of filling up the removed part of the patterned foundation layer 810, and the bad phenomena, such as bubbles, apertures and so on, can not occur on the surface of the transparent substrate 800.

Figure 8E:
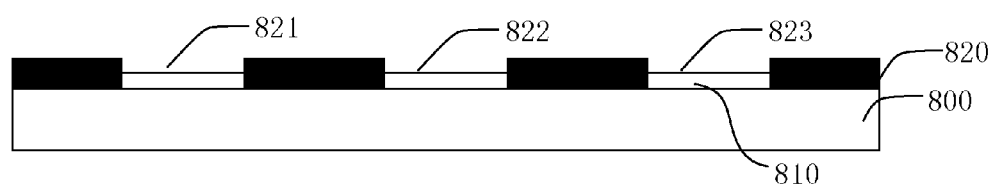

As shown in FIG. 8E and referring to the step S74, the light-shielding layer 820 is patterned, and the light-shielding layer 820 forms multiple through holes, which are corresponding to the remained part of the patterned foundation layer 810. This embodiment takes a first through hole 821, a second through hole 822 and a third through hole 823 as examples for representing multiple through holes. The through holes passing through the light-shielding layer 820 are formed on the surface of the foundation layer 810, so that ensuring that the bottoms of the through holes are on the foundation layer 810, but not directly on the transparent substrate 800. The patterned light-shielding layer 820 may adopt the photo-etching process.

Figure 8F:
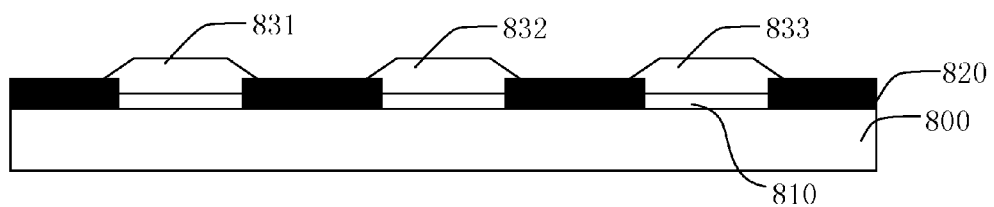

As shown in FIG. 8F, the step S75 is to form the color-resisting blocks. The color-resisting blocks are formed on the positions of the through holes. The position of each through hole correspondingly forms one color-resisting block. This embodiment takes the first through hole 821, the second through hole 822 and the third through hole 823 as examples for representing multiple through holes. Correspondingly, a first color-resisting block 831, a second color-resisting block 832 and a third color-resisting block 833 represent three color-resisting blocks correspondingly formed. The above three color-resisting blocks may be separately corresponding to the red resister, the green resister and the blue resister. This embodiment adopts a pigment disperse method for orderly forming the color-resisting blocks of three colors. The process of forming the first color-resisting block 831 is first forming a continuous color-resisting coating layer on the surface of the light-shielding layer 820 by spin coating, and then forming the first color-resisting block 831 on the position of the first through hole 821 by a photo-etching process. The following methods for forming the second color-resisting block 832 and the third color-resisting block 833 are same as above. FIG. 8F shows a schematic view of a filter after completely making the three color-resisting blocks. Subsequently, it needs to perform the following processes of making the filter, such as a splash plating process for plating the ITO (Indium Tin Oxide) on the color-resisting blocks, and so on.

Continuously referring to FIG. 8F, the filter made by performing above steps includes the transparent substrate 800; the patterned light-shielding layer 820 disposed on the surface of the transparent substrate 800 and including the multiple through holes represented by the first, second and third through holes 821, 822, 823; the foundation layer 810 disposed on the surface of the transparent substrate 800 and on the bottoms of the first, second and third through holes 821, 822, 823; and the multiple color-resisting blocks represented by the first, second and third color-resisting block 831, 832, 833, which are formed on the positions of the first, second and third through holes 821, 822, 823, wherein the position of each through hole correspondingly forms one color-resisting block.

The above filter disposes the foundation layer on the bottoms of the through holes to improve the bottom evenness of the through holes for eliminating the "ox horn-shaped segment difference" caused by the protruding edges of the color-resisting blocks formed later.

Figure 9:
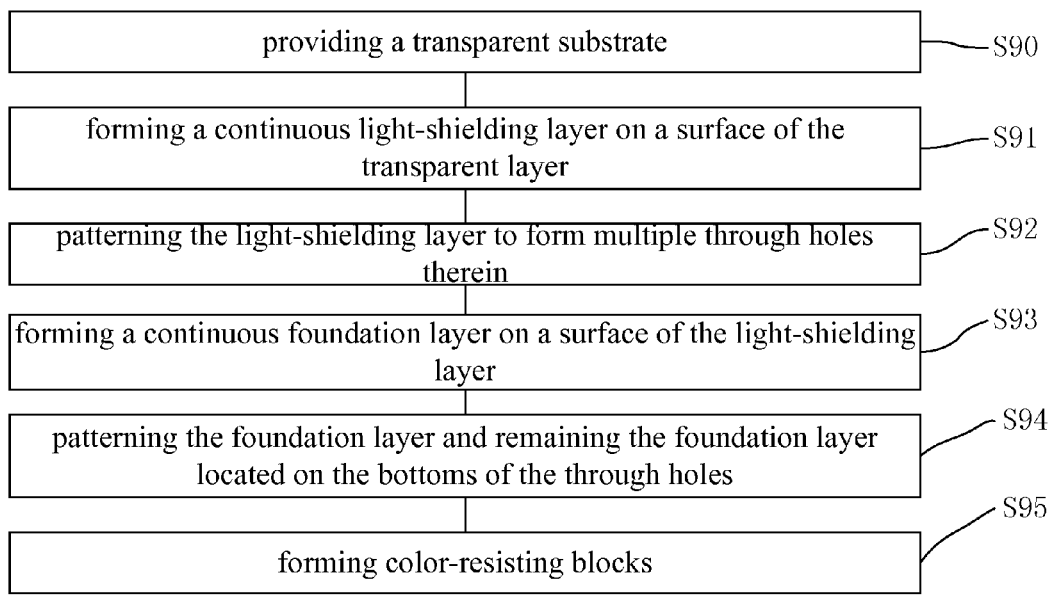
FIG. 9 is a schematic diagram of implementation steps of a fourth embodiment of a method of making a filter in the present invention.

FIG. 9 shows a fourth embodiment of a method of making a filter in the present invention, including the following steps: a step S90 providing a transparent substrate; a step S91 forming a continuous light-shielding layer on a surface of the transparent layer; a step S92 patterning the light-shielding layer to form multiple through holes therein; a step S93 forming a continuous foundation layer on a surface of the light-shielding layer; a step S94 patterning the foundation layer and remaining the foundation layer located on the bottoms of the through holes; a step S95 forming color-resisting blocks on the positions of the through holes, wherein the position of each through hole correspondingly forms one color-resisting block.

The step S90 is same as that of the third embodiment. Please refer to the previous embodiment and FIG. 8A, and not be repeated herein.

Figure 10A:
FIGS. 10A-10D are process schematic views of the method of the above fourth embodiment.

As shown in FIG. 10A and referring to the step S91, the continuous light-shielding layer 1020 is formed on the surface of the transparent layer 800. The embodiment is not first forming the foundation layer and then patterning it, but first forming the continuous light-shielding layer 1020.

Figure 10B:

As shown in FIG. 10B and referring to the step S92, the light-shielding layer 1020 is patterned to form multiple through holes represented by a first through hole 1021, a second through hole 1022 and a third through hole 1023. These through holes pass through the light-shielding layer 1020 to expose the transparent layer 800 under thereof. Although there is no the foundation layer under the through holes obtained after performing this step and there is the foundation layer under the through holes obtained after performing the corresponding step S74 of forming the through holes in the third embodiment, whether there is the foundation layer under thereof can not substantially effect on the patterning process of the light-shielding layer 1020. Therefore, this step is generally same as the step S74 of the third embodiment, and not repeated herein.

Figure 10C:
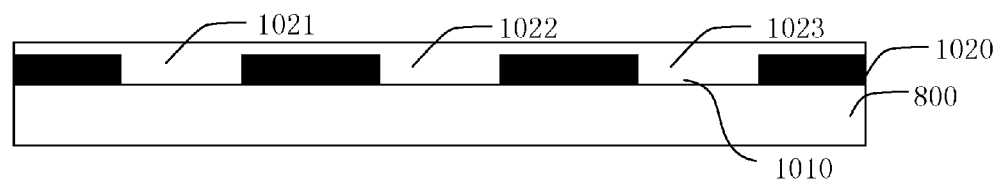

As shown in FIG. 10C and referring to the step S93, the continuous foundation layer 1010 is formed on the surface of the patterned light-shielding layer 1020. This step may adopt a coating process to form the foundation layer 1010 and should adjust the material of the foundation layer 1010 to make it have higher fluidity, so that the foundation layer 1010 is capable of filling up the removed part of the patterned light-shielding layer 1020 and the bad phenomena, such as bubbles, apertures and so on, can not be generated on the surface of the transparent substrate 800.

Figure 10D:
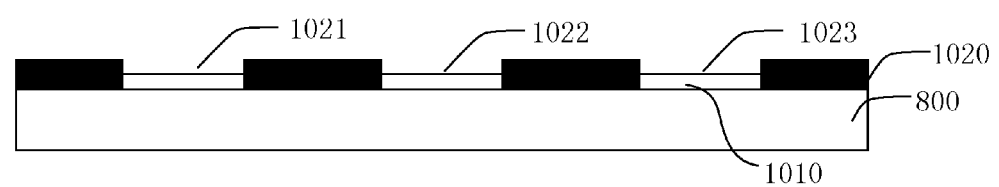

As shown in FIG. 10D and referring to the step S94, the foundation layer 1010 is patterned, but the part of the foundation layer 1010 located on the bottoms of the first through hole 1021, the second through hole 1022 and the third through hole 1023 is remained. This step may adopt the photo-etching process and control the etching time for remaining the foundation layer 1010 of an appropriate thickness.

The obtained structure after performing the above step is generally same as the obtained structure after performing the step S74 of the third embodiment, and the following steps of growing the color-resisting blocks are also generally same, so not repeated herein.

The difference between this embodiment and the third embodiment is that: the processes of forming the patterned foundation layer and the patterned light-shielding layer in the two embodiments are not completely same. The both objects are to form the patterned light-shielding layer 820(1020) on the surface of the transparent substrate 800. The light-shielding layer 820(1020) includes the multiple through holes represented by the first through hole 821(1021), the second through hole 822(1022) and the third through hole 823(1023). The foundation layer 810(1010) is disposed on the surface of the transparent substrate 800 under the bottoms of these through holes. The both embodiments dispose the foundation layer on the bottoms of the through holes and reduce the depths of the through holes by the foundation layer stacked in the through holes, thereby improving the bottom evenness of the through holes and eliminating the "ox horn-shaped segment difference" of the protruding edges of the color-resisting blocks formed later. The thickness of the foundation layer 810(1010) is less than that of the light-shielding layer 820 (1020). For the specific thickness of the foundation layer 810(1010), it may be determined by the thickness of the light-shielding layer 820(1020), the material of the color-resisting blocks, the product chroma, the designer experience obtained by experiment, and so on.

The above are the preferred embodiment modes, it should be pointed out that any person having ordinary skills in the art also can make many improvement and amendment within the principles of the present invention, and the improvement and amendment also should be considered belonging to the protection scope of the present invention.

What is claimed is:

1. A method of making a filter, characterized in that: the method including the following steps:
    providing a transparent substrate;
    calculating a thickness difference between different color-resisting blocks;
    forming a patterned foundation layer and a patterned light-shielding layer on a surface of the transparent substrate, wherein the patterned light-shielding layer including a first through hole, a second through hole and a third through hole, the foundation layer under at least one of the first, second and third through holes having a groove, and the depth of the groove being determined by the thickness difference of the color-resisting blocks obtained by calculating;
    forming a first color-resisting block on the position of the first through hole; and
    orderly forming a second and third color-resisting blocks on the positions of the second and third through holes according to the previous step.

2. The method of making the filter as claimed in claim 1, characterized in that: the step of forming the patterned foundation layer and the patterned light-shielding layer on the surface of the transparent substrate further includes:
    forming a continuous foundation layer on the surface of the transparent substrate;
    patterning the foundation layer to form at least one groove therein corresponding to the position of the through hole in the light-shielding layer according to the thickness difference of the color-resisting blocks obtained by calculating;
    forming a continuous light-shielding layer on a surface of the foundation layer; and patterning the light-shielding layer to form the first, second and third through holes.

3. The method of making the filter as claimed in claim 1, characterized in that: the step of forming the patterned foundation layer and the patterned light-shielding layer on the surface of the transparent substrate further includes:
   forming a continuous foundation layer on the surface of the transparent substrate;
   forming a continuous light-shielding layer on a surface of the foundation layer;
   patterning the light-shielding layer to form the first, second and third through holes; and
   patterning the foundation layer to form at least one groove therein corresponding to the position of the through hole in the light-shielding layer according to the thickness difference of the color-resisting blocks obtained by calculating.

4. The method of making the filter as claimed in claim 1, characterized in that: the first, second and third color-resisting blocks are orderly a red resister, a green resister and a blue resister.

5. The method of making the filter as claimed in claim 1, characterized in that: the first, second and third color-resisting blocks are orderly formed by a pigment disperse method.

6. The method of making the filter as claimed in claim 1, characterized in that: in the step of calculating the thickness difference between the different color-resisting blocks, the obtained thicknesses of the second and third color-resisting blocks by calculating are same and both less than that of the first color-resisting block; so in the step of forming the patterned foundation layer and the patterned light-shielding layer on the surface of the transparent substrate, the groove is formed on the foundation layer only under the first through hole, and the depth of the groove is equal to the thickness difference between the first and second color-resisting blocks.

7. The method of making the filter as claimed in claim 1, characterized in that: in the step of calculating the thickness difference between the different color-resisting blocks, the obtained thickness of the third color-resisting block by calculating is less than that of the second color-resisting block, and the thickness of the second color-resisting block is less than that of the first color-resisting block; so in the step of forming the patterned foundation layer and the patterned light-shielding layer on the surface of the transparent substrate, the foundation layer forms a first groove and a second groove separately located under the first through hole and the second through hole, the depth of the first groove is equal to the thickness difference between the first and third color-resisting blocks, and the depth of the second groove is equal to the thickness difference between the second and third color-resisting blocks.

8. The method of making the filter as claimed in claim 1, characterized in that:
   the method further includes a step of forming ITO on the surfaces of the first, second and third color-resisting blocks.

9. A method of making a filter, characterized in that: the filter including a first, second and third color-resisting blocks, the thicknesses of the second and third color-resisting blocks being same and both less than that of the first color-resisting block, the method including the following steps:
   providing a transparent substrate;
   calculating a thickness difference between the second color-resisting block and the first color-resisting block;
   forming a continuous foundation layer on a surface of the transparent substrate;
   patterning the foundation layer, and according to the thickness difference of the color-resisting blocks obtained by calculating to form a groove on the foundation layer under the position of a first through hole, which will be formed soon, wherein the depth of the groove being equal to the thickness difference of the first and second color-resisting blocks;
   forming a continuous light-shielding layer on a surface of the foundation layer;
   patterning the light-shielding layer to form the first through hole, a second through hole and a third through hole;
   forming the first color-resisting block on the position of the first through hole; and
   orderly forming the second and third color-resisting blocks on the positions of the second and third through holes according to the previous step.

10. The method of making the filter as claimed in claim 9, characterized in that: the first, second and third color-resisting blocks are orderly a red resister, a green resister and a blue resister.

11. The method of making the filter as claimed in claim 9, characterized in that: the first, second and third color-resisting blocks are orderly formed by a pigment disperse method.

* * * * *